United States Patent
Anderson et al.

(10) Patent No.: US 6,520,022 B1
(45) Date of Patent: Feb. 18, 2003

(54) DIRECT CONNECT PRESSURE TESTER ARRANGEMENT

(75) Inventors: Edward Anderson, Jonesboro, GA (US); Harmohindra Bhandal, New City, NY (US); Roger Miller, Cortlandt Manor, NY (US)

(73) Assignee: The Reliable Automatic Sprinkler Co., Inc., Mount Vernon, NY (US)

( * ) Notice: Subject to any disclaimer, the term of this patent is extended or adjusted under 35 U.S.C. 154(b) by 0 days.

(21) Appl. No.: 09/708,874

(22) Filed: Nov. 8, 2000

(51) Int. Cl.$^7$ .................................................. G01L 7/00
(52) U.S. Cl. ....................................................... 73/756
(58) Field of Search ........................... 73/756, 730, 753, 73/223, 866.5, 148.1

(56) References Cited

U.S. PATENT DOCUMENTS

| | | | |
|---|---|---|---|
| 3,557,620 A | 1/1971 | Jewett et al. .................. 73/388 |
| 3,797,317 A | 3/1974 | Peterson, Jr. ................. 73/420 |
| 4,577,511 A | 3/1986 | Wetzel ......................... 73/756 |
| 4,638,668 A * | 1/1987 | Leverberg ..................... 73/756 |
| 4,699,217 A | 10/1987 | McLennan et al. ........... 169/37 |
| 4,788,871 A | 12/1988 | Nelson et al. ............. 73/866.5 |
| 4,901,761 A * | 2/1990 | Taylor .......................... 73/756 |
| 5,101,666 A * | 4/1992 | Fowler ......................... 73/756 |
| 5,394,745 A | 3/1995 | Freeman .................... 73/118.1 |
| 5,396,814 A | 3/1995 | Tuttle et al. ............... 73/866.5 |
| 5,557,966 A * | 9/1996 | Corry ........................... 73/756 |
| 5,708,210 A | 1/1998 | Gardellin ...................... 73/730 |
| 5,760,296 A | 6/1998 | Wilson ........................ 73/49.7 |
| 5,834,652 A | 11/1998 | Koshimizu ................... 73/756 |
| 5,874,680 A | 2/1999 | Moore .......................... 73/756 |
| 5,945,606 A | 8/1999 | Takunaga et al. ............. 73/756 |
| 5,971,001 A | 10/1999 | Andersson .................... 137/15 |
| 5,992,438 A | 11/1999 | Shaw .......................... 137/14 |
| 5,996,430 A | 12/1999 | Bellis, Sr. .................. 73/866.5 |
| 6,199,432 B1 * | 3/2001 | Dunn ........................... 73/756 |
| 6,202,481 B1 * | 3/2001 | Basore ......................... 73/756 |
| 6,298,730 B1 * | 10/2001 | Yamagishi et al. ........... 73/223 |

* cited by examiner

Primary Examiner—Benjamin R. Fuller
Assistant Examiner—Andre Allen
(74) Attorney, Agent, or Firm—Baker Botts LLP

(57) ABSTRACT

In the representative embodiments described in the specification, a direct connect pressure tester arrangement has a saddle which is clamped to a pipe which may contain fluid under pressure and has a drill guide with an opening extending perpendicular to the wall of the pipe, along with a resilient member held against the outer wall of the pipe. A crosspipe is attached to a bushing mounted in the saddle and a valve is attached to the crosspipe in axial alignment with the bushing with a drill supported in axial alignment on the other side of the valve. A pressure gauge is mounted in a perpendicular passage of the crosspipe and a drain valve is attached to the cross pipe in axial alignment with the pressure gauge. After the pressure tester has been mounted on the pipe to be tested, the valve adjacent to the drill bit is turned to the open position and the drill bit is moved through the valve and the drill guide and operated to drill a hole in the pipe. The pressure gauge indicates the presence of any fluid under pressure in the pipe. The drill bit is then withdrawn through the crosspipe and the open valve which is then closed and the drain valve can be opened to drain to any fluid under pressure from the pipe being tested.

20 Claims, 8 Drawing Sheets

DIRECT CONNECT PRESSURE TESTER ARRANGEMENT

BACKGROUND OF THE INVENTION

This invention relates to pressure testers connected directly to pipes to measure the pressure of fluid inside the pipes.

Sections of piping systems containing fluid under pressure may, from time to time, require replacement. Often, there may be no pressure gauge proximal to the section being replaced. Moreover, in complex piping systems or where portions of the system are either inaccessible or not easily traceable, it may be difficult if not impossible to determine whether the section of the piping system to be replaced has been isolated from the Test of the system or to be certain that the pressure gauge being relied upon is not isolated from the section to be replaced. For example, in a sprinkler system installed in a building, a sprinkler head may need to be replaced that physically resides in an office or other space containing electrical equipment such as computers, in addition to documents and books. Thus, it is advantageous when removing a section of piping to know the pressure in the pipe and to be able to drain or otherwise remove the fluid in the pipe substantially without leakage.

The Andersson U.S. Pat. No. 5,971,001 discloses a fitting assembly clamped to the outside of a fluid filled conduit along with a threaded bushing having an axial bore for guiding a drill to drill a hole in the side of the conduit. After the hole has been drilled, the drill is removed and a sensing unit is connected to the bushing for sensing a characteristic of the fluid in the conduit. The Tuttle et al. U.S. Pat. No. 5,396,814 discloses an arrangement for hot tapping a pipe by mounting an assembly having a drill guide extending at an angle to the pipe and drilling a hole in the pipe and then replacing the drill with a cleaning assembly to remove metal shavings. In this case, the fluid in the pipe may be under pressure and the drill is withdrawn through a valve which can then be closed to prevent leakage of the fluid. A sensor carrier retainer attached to the valve may be opened to permit insertion of a sensor which is then detached from the carrier. The Nelson et al. U.S. Pat. No. 4,788,871 shows a probe having a hollow tube with a piercing end which is forced through the plastic wall of a container and has a threaded external part which is secured to the plastic wall. The Wetzel U.S. Pat. No. 4,577,511 discloses an air line pressure tester having a sensing probe which is inserted between resilient caskets into the interior of a pipe to detect pressure in the pipe.

SUMMARY OF THE INVENTION

Accordingly, it is an object of the present invention to provide a direct connect pressure tester arrangement which overcomes disadvantages of the prior art.

Another object of the present invention is to provide a portable arrangement for testing the pressure of a fluid in a pipe to be removed that substantially minimizes unwanted leakage when determining the pressure in the pipe and when removing the pipe.

These and other objects of the invention are attained by providing a pressure tester arrangement for determining the pressure of a fluid inside a pipe that includes a saddle clamped to the outside of the pipe, a passage extending from the outside of the wall of the pipe and through the saddle for receiving a drill bit movable within the passage for drilling a hole in the pipe, and a branch line for receiving a pressure gauge for determining the pressure in the pipe to which the tester is connected.

In one aspect of the invention, the pressure tester arrangement includes a plug coupled to the end of the passage distal to the saddle. The plug includes an axial channel for receiving the drill bit. The plug further includes a groove in the axial channel for receiving an O-ring through which the shank of the drill bit is inserted. A collar is fixably coupled to the drill bit forming a drill bit assembly. The drill bit assembly is slidably moveable in the passage such that the collar is moveable between the saddle and the plug.

In another aspect of the invention, the pressure tester arrangement further includes a valve coupled between the crosspipe and the plug. The length between the collar and the end of the drill bit distal to the plug is less than the length between the valve and the plug such that the valve is closable when the drill bit assembly is retracted when the collar is adjacent to the plug.

In another aspect of the invention, the pressure tester arrangement includes a ball and the axial channel of the plug further includes a larger diameter portion proximal to the saddle, a smaller diameter portion distal to the saddle and a tapered section between the smaller and larger portions. The diameter of the ball is sufficient when seated against the tapered section to form a seal. A bushing is coupled between the saddle and the plug wherein the bushing includes a threaded channel for receiving the plug, a cavity extending from the threaded channel, and a drill guide subassembly inserted in the cavity. The diameter of the cavity is sufficiently large and the diameter of the ball is sufficiently small such that the ball when residing in the cavity is not in line with an opening in the drill guide subassembly for receiving the drill bit. The diameter of the opening in the drill guide subassembly is smaller than the diameter of the ball.

In an additional aspect of the invention, the pressure tester arrangement includes a valve coupled between the crosspipe and the plug. The crosspipe is coupled to the saddle for connecting the passage to the branch line to the pressure gauge and for connecting the passage to a drain line. The drain line includes a drain valve coupled to the crosspipe.

In another aspect of the invention, at least one drill guide is inserted in the passage and a curved center section is coupled between the pipe and the saddle forming a seal between the pipe and the saddle. The saddle contains one of the drill guides. In this embodiment, the curved center section is composed of a resilient material.

In an aspect of the invention, the saddle further includes a pair of forked ends for receiving a U-bolt. The pipe is clamped between the saddle and the U-bolt.

In an additional aspect of the invention, the pressure gauge is coupled to the branch line and the drill bit is inserted in the passage. A drill is coupled to the drill bit.

In a further aspect of the invention, a direct connect pressure tester arrangement is provided including a passage comprising a saddle clamped to a pipe capable of containing fluid under pressure, a drill guide with an opening extending perpendicular to the wall of the pipe, a resilient member between the saddle and the outer wall of the pipe forming a seal, a crosspipe attached to a bushing mounted in the saddle, a valve attached to the crosspipe in axial alignment with the bushing and a plug coupled to the valve. The plug includes a channel. A drill bit is received in the passage. A pressure gauge is mounted in a perpendicular passage of the crosspipe and a drain valve is attached to the crosspipe in axial alignment with the pressure gauge. The plug receives the drill bit in the channel, forming a seal between the plug and the drill bit.

After the pressure tester has been mounted on the pipe to be tested, the valve adjacent to the drill is turned to the open position and the drill bit is moved through the valve and the drill guide and operated to drill a hole in the pipe. The pressure gauge will then indicate the presence of any fluid under pressure in the pipe. The drill can then be withdrawn through the crosspipe and the open valve which can then be shut and the drain valve can be opened to drain to any fluid under pressure from the pipe being tested.

BRIEF DESCRIPTION OF THE DRAWINGS

Further objects and advantages of the invention will be apparent from a reading of the following description in conjunction with the accompanying drawings in which.

DESCRIPTION OF PREFERRED EMBODIMENTS

Figure 1:
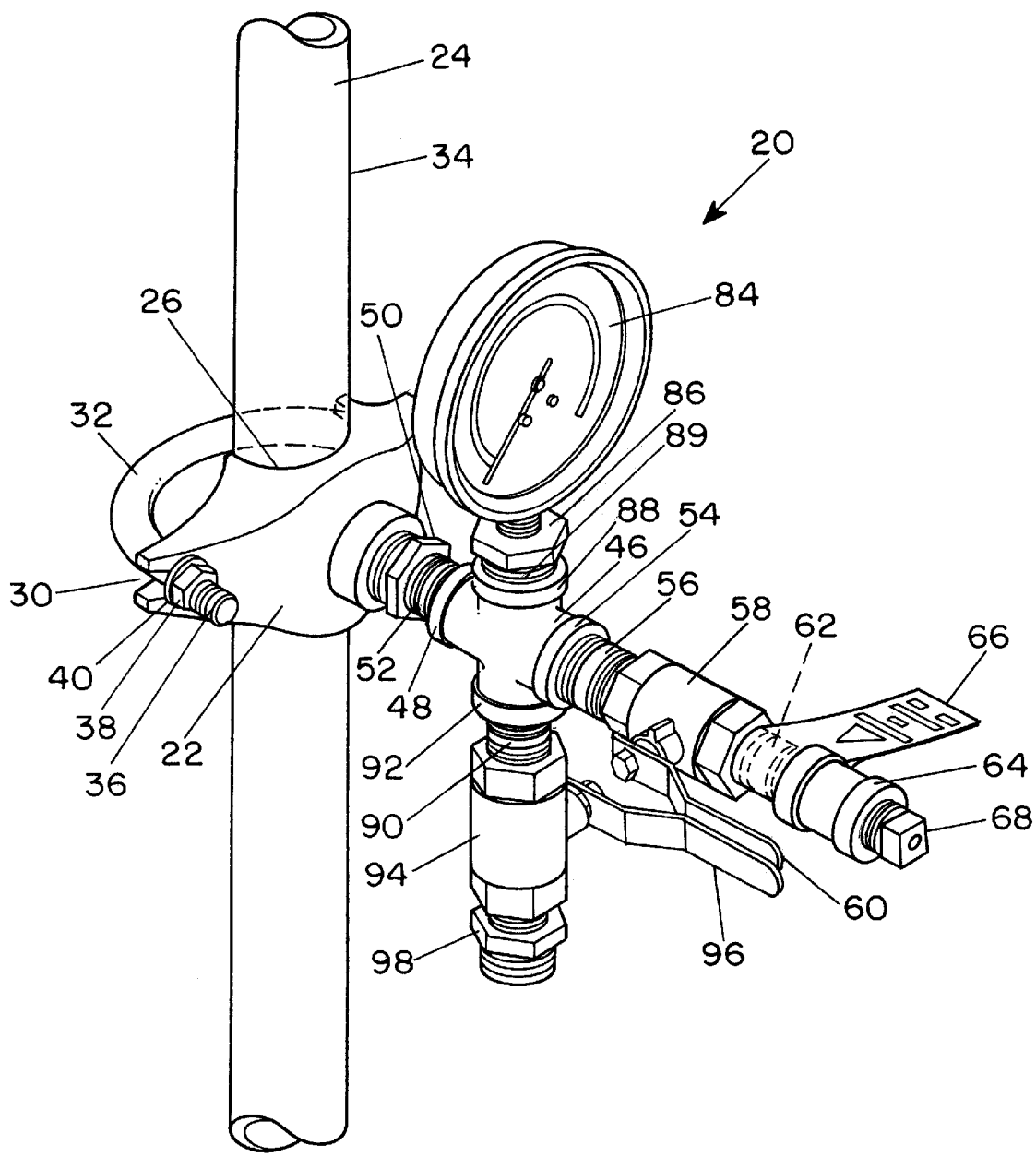
FIG. 1 is a perspective view illustrating a representative embodiment of a pressure tester arrangement in accordance with the invention.
Figure 2:
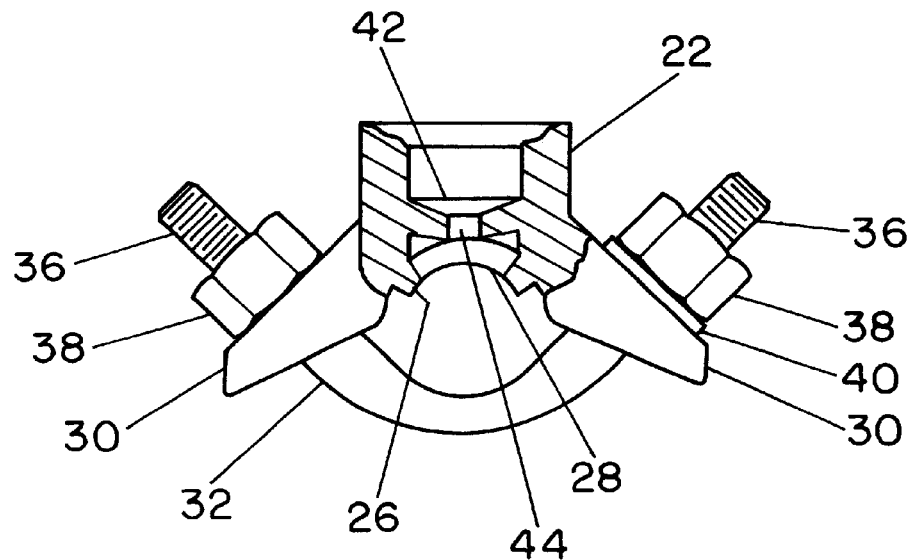
FIG. 2 is a top cross-sectional view illustrating the saddle and U-bolt member of the arrangement shown in FIG. 1.
Figure 3:
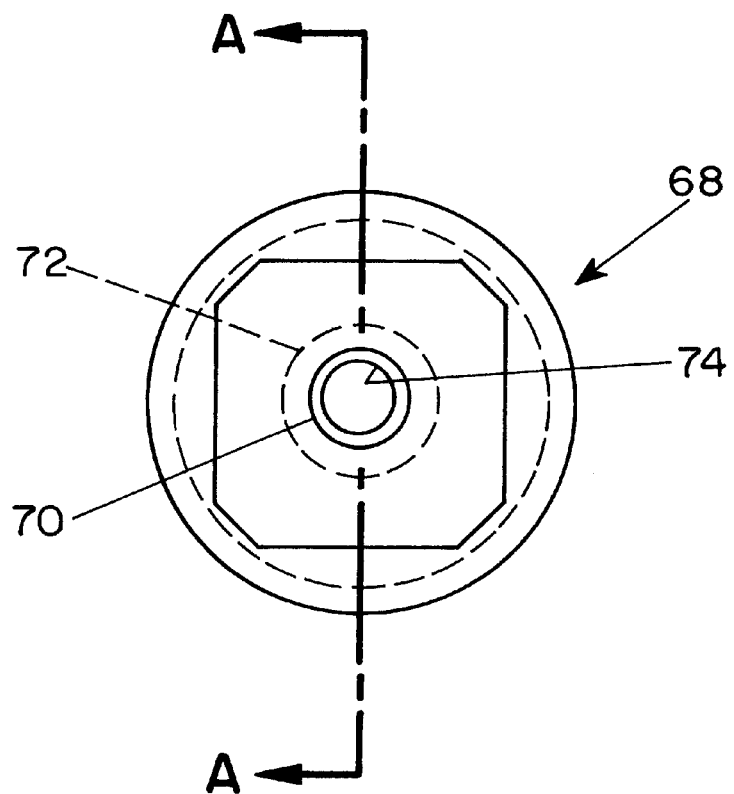
FIG. 3 is a front view illustrating the plug and O-ring of the arrangement shown in FIG. 1.
Figure 4:
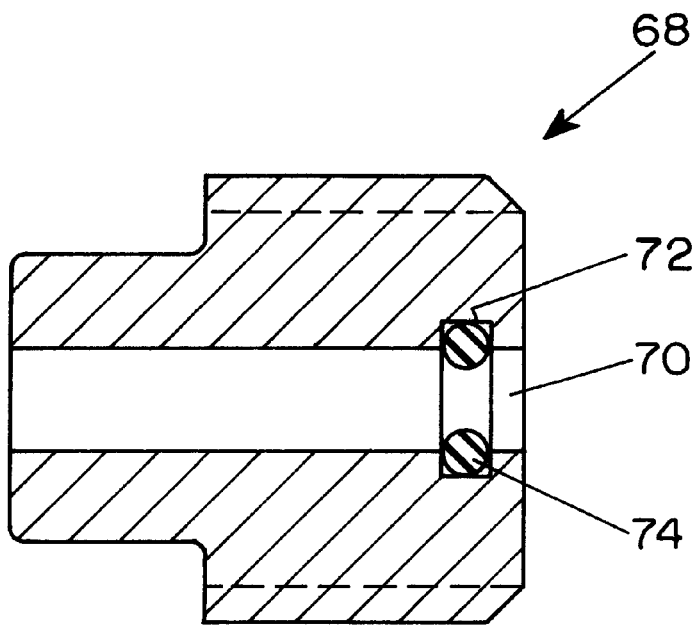
FIG. 4 is a longitudinal cross-sectional view of the plug and O-ring shown in FIG. 3 taken on the line A—A of FIG. 3 and looking in the direction of the arrows.

In the typical embodiment of the invention illustrated in the drawings, a direct connect pressure tester arrangement 20 includes a saddle 22 which is clamped to a pipe 24 which may contain fluid under pressure. As shown in FIGS. 1 and 2, the side of the saddle 22 clamped to the pipe 24 has a curved center section 26, preferably constructed of a resilient material, that contours to the curvature of the pipe and forms a seal with the pipe. The curved center section 26 includes a space 28 at its center. The saddle 22 has forked ends 30 extending substantially perpendicular from the pipe 24. A U-bolt member 32 holds the saddle 22 against the outer wall 34 of the pipe 24. The U-bolt member 32 has two threaded ends 36. Each threaded end 36 of the U-bolt member 32 is received by one of the forked ends 30 of the saddle 22. Nuts 38 are threaded onto the threaded ends 36 of the U-bolt member 32 to tighten the saddle 22 and U-bolt member 32 against the pipe 24. Washers 40 are placed between the nuts 38 and the forked ends 30. Alternatively, one of the forked ends 30 can instead be closed forming an oval shaped opening to receive one end of a U-bolt member 32. The saddle 22 has a drill guide 42 with an opening 44 slightly greater than 3/16 inch in diameter extending perpendicular to the outer wall 34 of the pipe 24 and at least partially in line with the space 28 of the curved center section 26. A crosspipe 46 is attached on a first end 48 to a first bushing 50 mounted in the saddle 22 via a first nipple 52. A second end 54 of the crosspipe 46 is attached to a second nipple 56 which is attached to a half-inch ball valve 58 in axial alignment with the first bushing 50. The valve 58 has a valve handle 60 for opening and shutting the valve. The other end of the valve 58 has a third nipple 62 attached to a coupling 64. A caution label 66 is attached around the third nipple 62. A half inch plug 68 is threaded to the other end of the coupling 64. FIG. 3 is an axial view and FIG. 4 is a cross-sectional longitudinal view of the plug 68 which has a channel 70 along the axis of the plug. The channel 70, approximately 0.2 inches in diameter, includes a groove 72, approximately 0.3 inches in diameter, axially aligned with the channel towards the end of the plug 68 proximal to the coupling 64 for receiving an O-ring 74.

Figure 5:
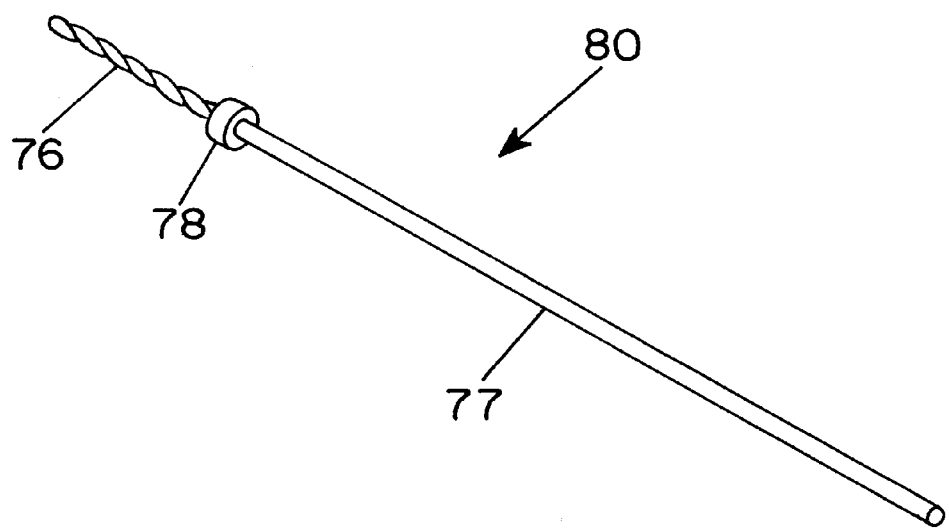
FIG. 5 is a perspective view of the drill bit assembly of the arrangement shown in FIG. 1.

A drill bit 76 is supported in axial alignment on the side of the valve 58 with the coupling 64. As shown in FIG. 5, a collar 78 with a set screw (not shown) is coupled to the drill bit 76 forming a drill bit assembly 80. The drill bit assembly 80 is coupled to a drill 82. The shank 77 of the drill bit 76 is inserted through the O-ring 74. The O-ring 74 in the groove 72 of the plug 68 maintains a seal around the drill bit assembly 80. The collar 78 is on the coupling-side of the plug 68 and the channel 70 has a diameter sufficiently smaller than the diameter of the collar to prevent the drill bit assembly 80 from being slidably removable from the arrangement 20 when the plug 68 is threaded to the coupling 64. The drill bit 76 is slidable within the passage formed between the pipe 24 and the plug 68.

A pressure detector, in this embodiment a pressure gauge 84, via a second bushing 86 is mounted in a third end 88 of the crosspipe 46 in a branch line 89 perpendicular to the passage formed by the first bushing 50 and the valve 58. A fourth nipple 90 is attached to a fourth end 92 of the crosspipe 46. The fourth nipple 90 is attached to a half inch ball drain valve 94 which is in axial alignment with the pressure gauge 84. A drain valve handle 96 opens and shuts the drain valve 94. The other end of the drain valve 94 is attached to a garden hose fitting 98.

Figure 6:
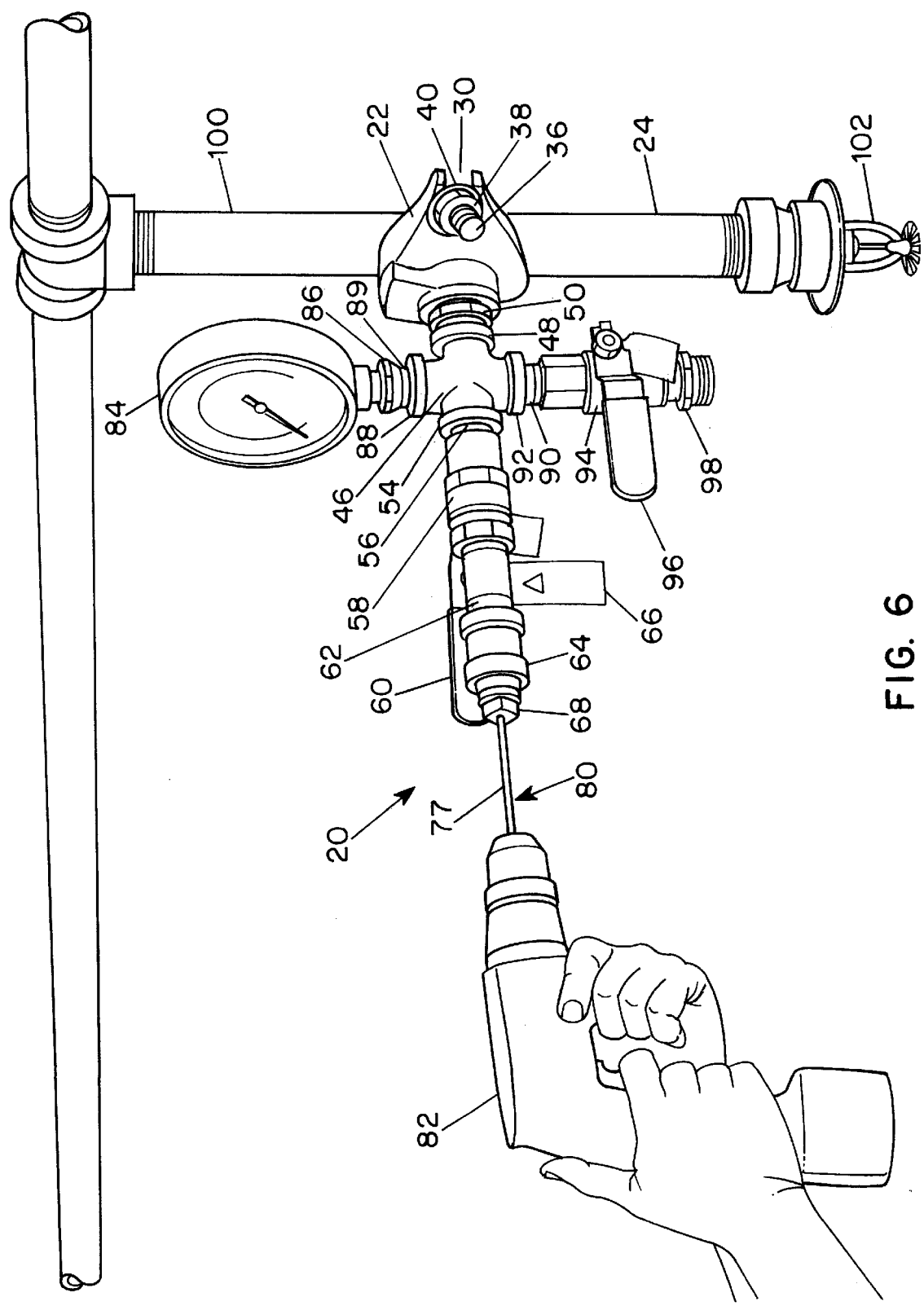
FIG. 6 is a perspective view of the arrangement illustrated in FIG. 1.
Figure 7:
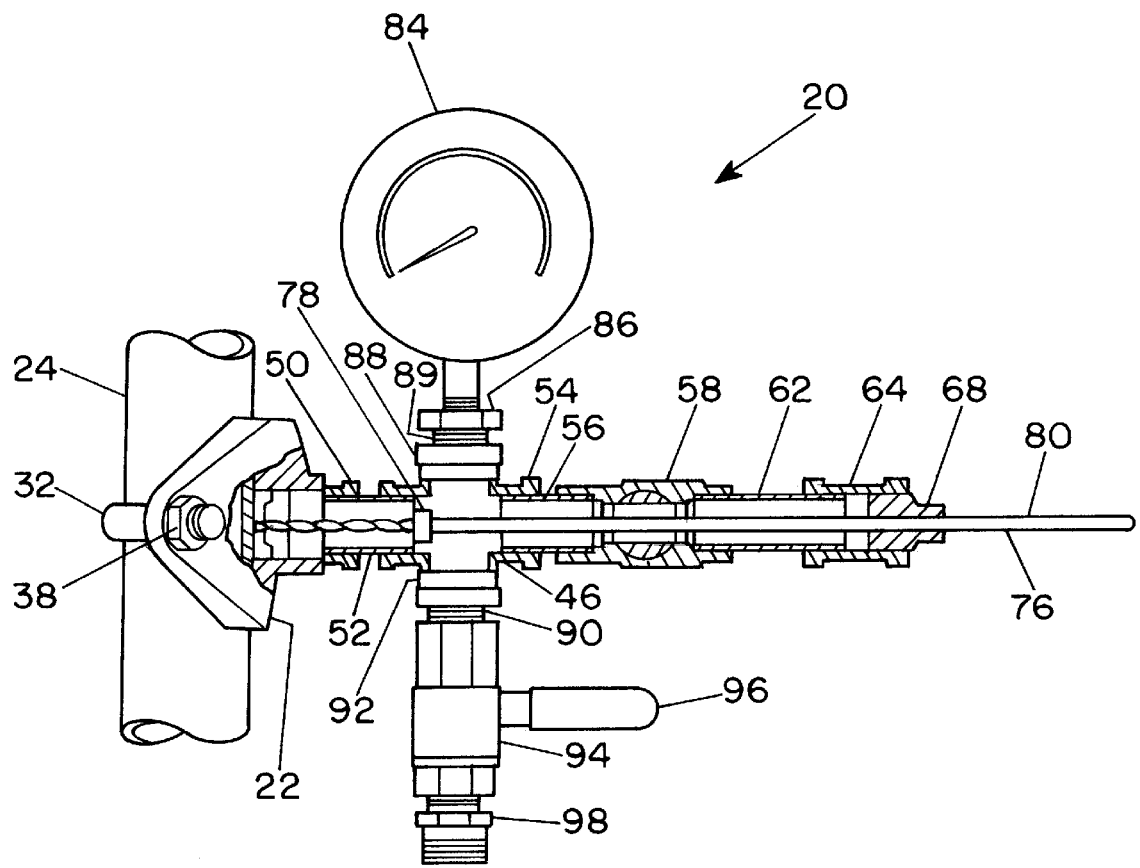
FIG. 7 is a longitudinal view of the arrangement of FIG. 1, with the pressure gauge rotated 90° and depicting the drill bit assembly inserted into the arrangement of FIG. 4.
Figure 8:
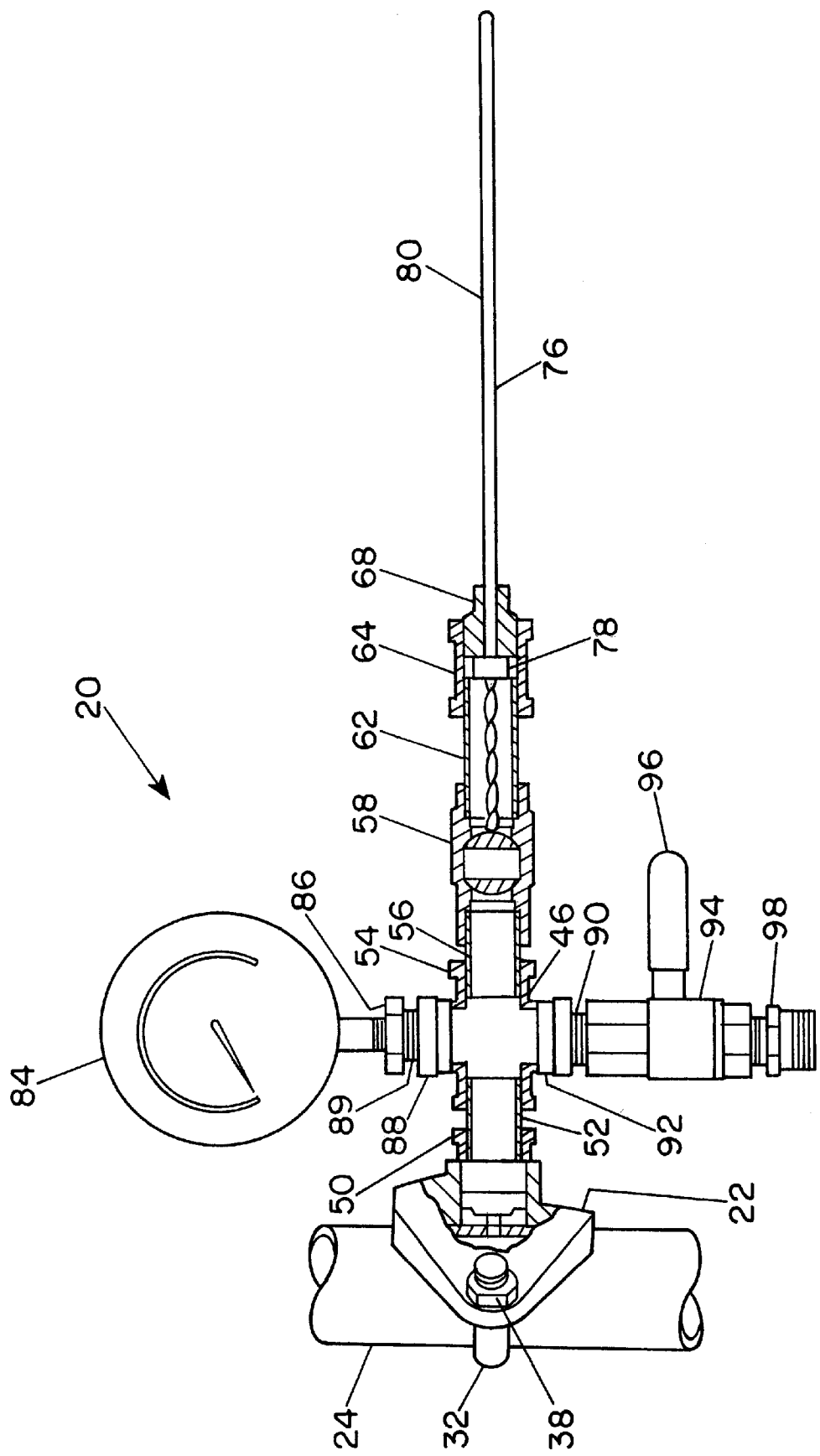
FIG. 8 is a longitudinal view of the arrangement of FIG. 1, with the pressure gauge rotated 90° and depicting the drill bit assembly partially retracted from the arrangement.

In a typical embodiment shown in FIGS. 6–8, the pressure tester arrangement 20 is operated as follows. The source of fluid to the pipe 24 is shut off. The O-ring 74 is lubricated with silicone grease. The drill bit assembly 80 is lubricated and then inserted into the plug 68. The pressure tester arrangement 20 is then clamped on the pipe 24 to be tested, preferably on a drop nipple 100 above a sprinkler head 102 being replaced as shown in FIG. 6. If not already installed, the drill bit assembly 80 is inserted through the plug 68 and the plug is threaded onto the coupling 64. If not already attached, the drill bit assembly 80 is attached to the drill 82, preferably a cordless drill to prevent shock or electrical shorting in case of water leakage during drilling. The valve 58 is turned to the open position using the valve handle 60 and the drill bit assembly 80 is moved through the passage which includes the valve and the drill guide 42. The drill 82 is operated to drill a hole in the pipe 24 as shown in FIG. 7. Any pressure in the pipe 24 will be observed at the pressure gauge 84. Next, the drill 82 and the drill bit assembly 80 are retracted until the collar 78 of the drill bit assembly 80 is stopped by the plus 68 as shown in FIG. 8. Once the drill bit assembly 80 is withdrawn through the crosspipe 46, the open valve 58 can be shut with the valve handle 60. A garden hose (not shown) is attached to the garden hose fitting 98. The system is drained by opening the drain valve 94 using the drain valve handle 96. The pressure gauge 84 will indicate the presence of any remaining fluid under pressure in the pipe 24.

Figure 9:
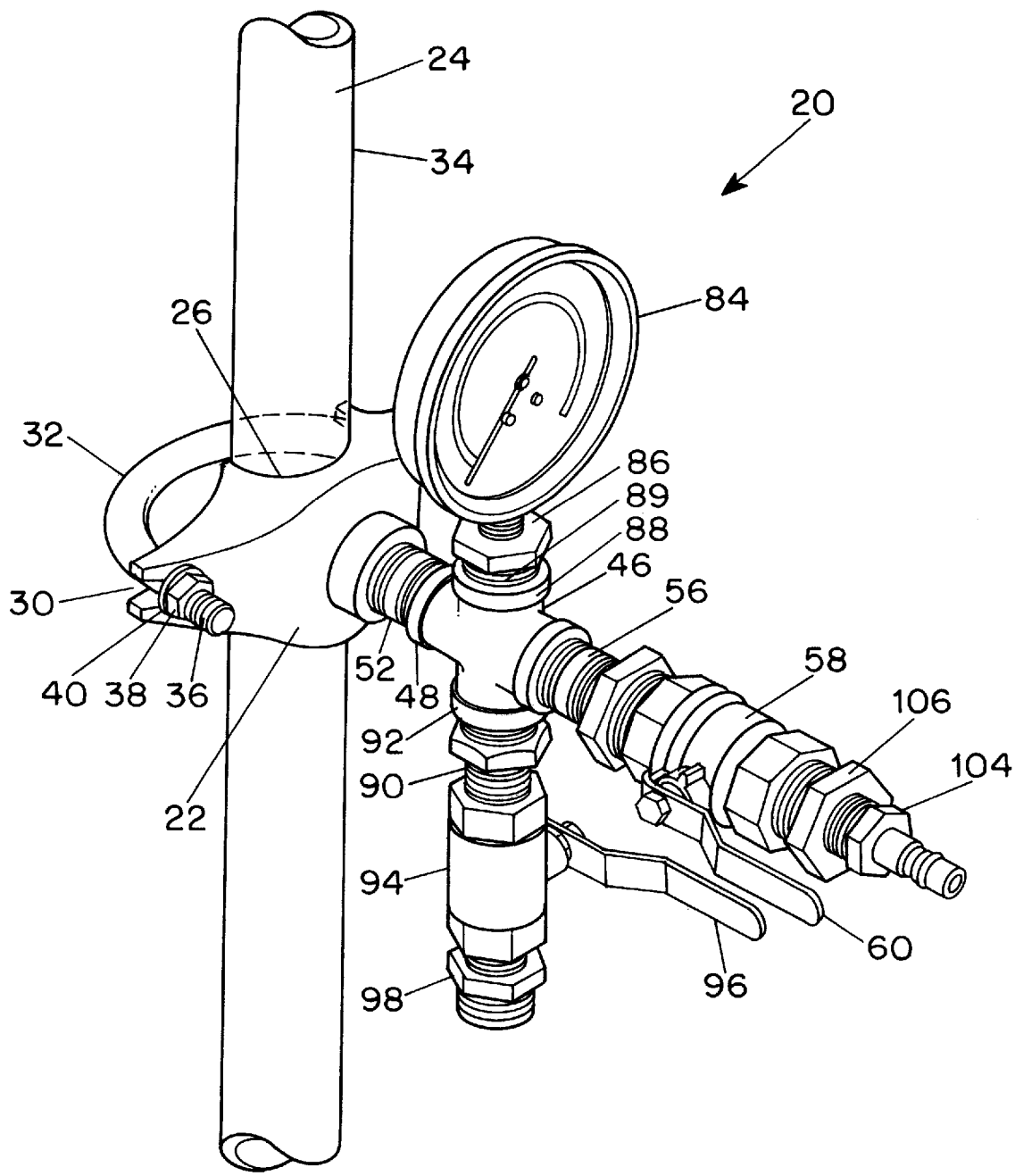
FIG. 9 is a perspective view illustrating a second representative embodiment of a pressure tester arrangement in accordance with the invention.
Figure 10:
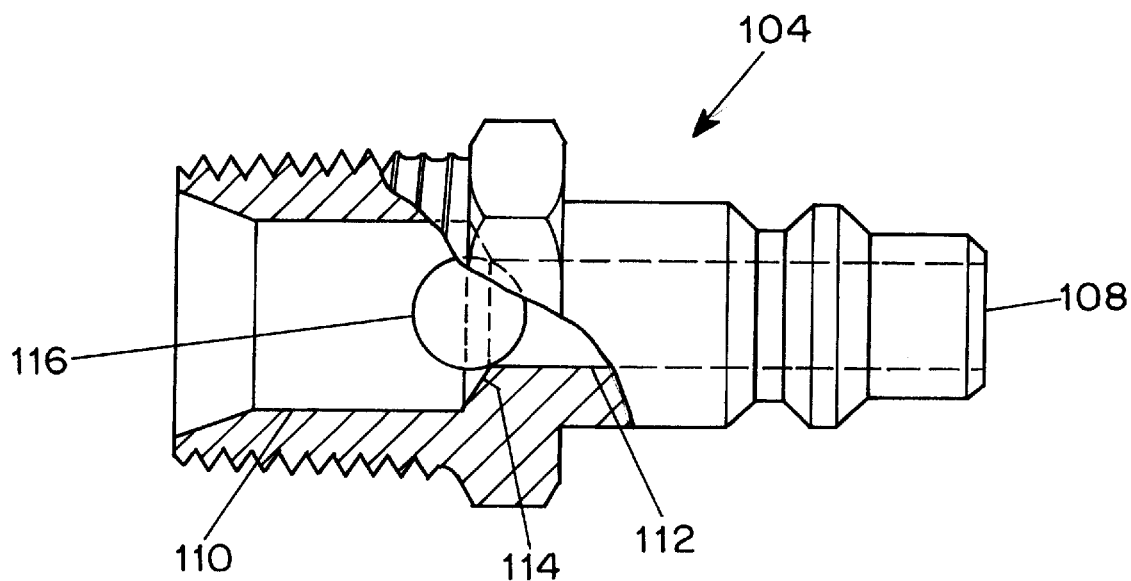
FIG. 10 is a longitudinal partial cross-sectional view illustrating the modified plug of the arrangement shown in FIG. 9.
Figure 11:
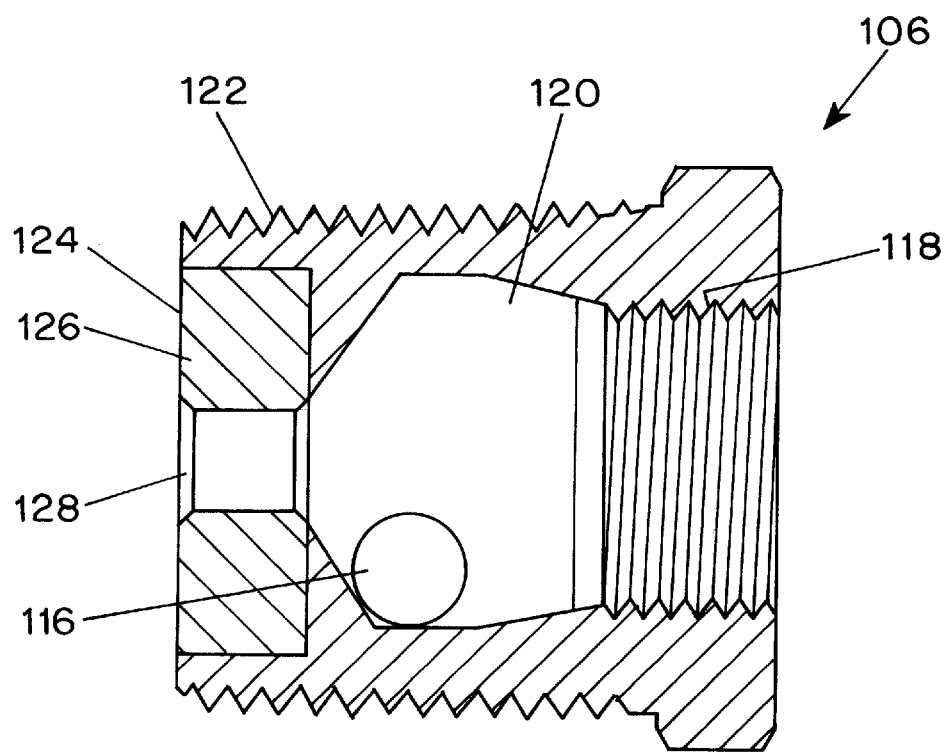
FIG. 11 is a longitudinal cross-sectional view illustrating the modified bushing of the arrangement shown in FIG. 9.

In another typical embodiment in which components common to the above-described embodiment are identified by the same numerals, FIG. 9 illustrates the arrangement 20 with a modified plug 104 and a modified bushing 106 which replace the plug 68 and the coupling 64 in the above-described embodiment. As shown in FIG. 10, the modified plug 104 includes an axial channel 108 having a larger diameter portion 110 approximately one half inch in diameter and a smaller diameter portion 112 between 0.25 and 0.30 inches in diameter. Between the two portions 110 and 112 is a tapered section 114 for receiving a steel ball 116 having a diameter of 5/16 inches. The outside of the larger diameter portion 110 is threaded to be received by the modified bushing 106 illustrated in FIG. 11. The modified bushing 106 at a first end includes a threaded channel 118 for receiving the modified plug 104. The threaded channel 118 extends longitudinally across approximately one half of the modified bushing 106. The remaining portion along the longitudinal axis of the modified bushing 106 includes a cavity 120 that extends to the second end of the modified bushing. The second end of the modified bushing 106 includes external threads 122 for mating with the valve 58. A drill guide subassembly 124 includes a disk 126 with an opening 128 at the center approximately one quarter inch in diameter through which the drill bit 76 can be inserted. The drill guide subassembly 124 is installed at the second end of the modified bushing 106. One of the functions of the drill guide subassembly 124 is to prevent the steel ball 116 from reaching valve 58. As shown in FIG. 11, the longitudinal length of the cavity 120 with the drill guide subassembly 124 installed is approximately one half inch and is sufficient for the steel ball 116 to fit between the drill guide subassembly and the threaded channel 118 and the diameter of the cavity 120 is approximately one inch which is sufficiently large that when the steel ball is between the drill guide subassembly and the threaded channel, the steel ball does not interfere with the drill bit 76 when the drill bit is inserted through the modified plug 104 and the modified bushing 106. The disk 126 and the portion of the cavity 120 receiving the drill guide assembly 124 have a slightly larger diameter than the remainder of the cavity for preventing the disk from encroaching upon the portion of the cavity provided for retaining the steel ball 116. In this embodiment, a collar 78 is not coupled to the drill bit 76 and thus the drill bit is removable from the arrangement without disconnecting the modified plug 104.

The modified plug 104 receives the drill bit 76 through the axial channel 108. When the drill bit 76 is inserted through the modified plug 104, if the steel ball 116 is not already in the cavity 120, the drill bit pushes the steel ball into the cavity and then the drill bit extends through the drill guide subassembly 124, the valve 58, the first nipple 52 and the drill guide 42 and curved center section 26 in the saddle 22. The drill 82, coupled to the drill bit 76, is used to drill a hole in the pipe 24. The drill bit 76 is then fully retracted from the arrangement 20 and the pressure from the fluid, if any, in the pipe 24 forces the steel ball 116 to seat against the tapered section 114 of the modified plug 104 preventing fluid from leaking through the modified plug. The pressure gauge 84 indicates the pressure in the pipe 24.

The valve 58 can then be shut with the valve handle 60. The drain valve 94 can be opened with the drain valve handle 96 to drain to any fluid under pressure from the pipe 24 being tested.

Although the invention has been described herein with reference to specific embodiments, many modifications and variations therein will readily occur to those skilled in the art. Accordingly, all such variations and modifications are included within the intended scope of the invention.

We claim:

1. A pressure tester arrangement for determining the presence of a fluid under pressure inside a pipe comprising:

a saddle arranged to be clamped to the outside of a pipe;

a passage extending from the outside of the wall of the pipe and through the saddle for receiving a drill bit movable within the passage for drilling a hole in the pipe; and a branch line in the passage for receiving a pressure detector for detecting fluid pressure in the pipe to which the tester is clamped.

2. A pressure tester arrangement according to claim 1 further comprising a plug coupled to the end of the passage distal to the saddle wherein the plug includes an axial channel for receiving the drill bit.

3. A pressure tester arrangement according to claim 2 wherein the plug further includes a groove in the axial channel for receiving an O-ring through which the drill bit is inserted.

4. A pressure tester arrangement according to claim 3 further comprising a collar fixably coupled to the drill bit forming a drill bit assembly and wherein the drill bit assembly is slidably moveable in the passage such that the collar is moveable between the saddle and the plug.

5. A pressure tester arrangement according to claim 4 further comprising a valve coupled between the branch line and the plug.

6. A pressure tester arrangement according to claim 5 wherein the distance between the collar and the end of the drill bit distal to the plug is less than the distance between the valve and the plug so the valve is closable when the drill bit assembly is retracted to position the collar adjacent to the plug.

7. A pressure tester arrangement according to claim 5 further comprising:

a crosspipe in the passage between the end of the passage proximal to the saddle and the valve; and a drain valve couple to the crosspipe.

8. A pressure tester arrangement according to claim 2 further comprising a ball and wherein the axial channel of the plug further comprises:

a larger diameter portion proximal to the saddle;

a smaller diameter portion distal to the saddle;

a tapered section between the smaller and larger portions; and wherein the diameter of the ball is sufficient when seated against the tapered section to form a seal with the tapered section.

9. A pressure tester arrangement according to claim 8 further comprising a bushing coupled between the saddle and the plug wherein the bushing further comprises:

a threaded channel for receiving the plug;

a cavity extending from the threaded channel;

a drill guide subassembly in the cavity; and wherein the the diameter of the cavity is sufficiently large and the diameter of the ball is sufficiently small that the ball when located in the cavity is not in line with an opening in the drill guide subassembly for receiving the drill bit and wherein the diameter of the opening in the drill guide subassembly is smaller than the diameter of the ball.

10. A pressure tester arrangement according to claim 9 further comprising a valve coupled between the branch line and the plug.

11. A pressure tester arrangement according to claim 1 further comprising a crosspipe coupled to the saddle for connecting the passage to the branch line including the pressure detector and for connecting the passage to a drain line.

12. A pressure tester arrangement according to claim 11 wherein the drain line comprises a drain valve coupled to the crosspipe.

13. A pressure tester arrangement according to claim 1 further comprising:
   at least one drill guide inserted in the passage; and
   a curved center section coupled between the pipe and the saddle forming a seal between the pipe and the saddle.

14. A pressure tester arrangement according to claim 13 wherein the saddle includes a drill guide.

15. A pressure tester arrangement according to claim 13 wherein the curved center section comprises a resilient material.

16. A pressure tester arrangement according to claim 1 wherein the saddle further comprises at least one forked end for receiving a U-bolt and wherein the pipe is clamped between the saddle and the U-bolt.

17. A pressure tester arrangement according to claim 1 wherein the pressure detector comprises a pressure gauge coupled to the branch line.

18. A pressure tester arrangement according to claim 1 further comprising a drill bit insertable in the passage.

19. A pressure tester arrangement according to claim 18 further comprising a drill coupled to the drill bit.

20. A pressure tester arrangement comprising:
   a fluid-tight passage comprising:
      a saddle clamped to a pipe to be tested for fluid under pressure;
      a drill guide having an opening extending perpendicular to the wall of the pipe;
      a resilient member forming a seal between the saddle and the outer wall of the pipe;
      a bushing mounted in the saddle;
      a crosspipe attached to the bushing;
      a valve attached to the crosspipe in axial alignment with the bushing; and
      a plug coupled to the valve and including a channel;
      a drill bit receivable in the passage;
      a pressure gauge mounted in a perpendicular passage of the crosspipe; and
   a drain valve attached to the crosspipe in axial alignment with the pressure gauge; and
   wherein the plug sealably receives the drill bit in the channel.

* * * * *

UNITED STATES PATENT AND TRADEMARK OFFICE
CERTIFICATE OF CORRECTION

PATENT NO.    : 6,520,022 B1                                        Page 1 of 1
DATED         : February 18, 2003
INVENTOR(S)   : Anderson et al.

It is certified that error appears in the above-identified patent and that said Letters Patent is hereby corrected as shown below:

<u>Title page,</u>
Item [57], ABSTRACT,
Line 20, "to" (second occurrence) should be deleted <u>Column 3,</u>
Line 8, "to" (second occurrence) should be deleted <u>Column 4,</u>
Line 62, "plus" should read -- plug --

<u>Column 6,</u>
Line 1, "to" (second occurrence) should be deleted
Line 45, "couple" should read -- coupled --
Line 51, "saddle;" should read -- saddle; and --
Line 52, "portions;" should read -- portions, --
Line 53, "and" should be deleted
Line 61, "channel;" should read -- channel; and --
Line 62, "cavity; and" should read -- cavity, --
Line 64, "the" (second occurrence) should be deleted <u>Column 8,</u>
Line 18, "and" should be deleted
Line 24, "gauge; and" should read -- gauge, --

Signed and Sealed this

Tenth Day of June, 2003

JAMES E. ROGAN
*Director of the United States Patent and Trademark Office*